Figure 4:
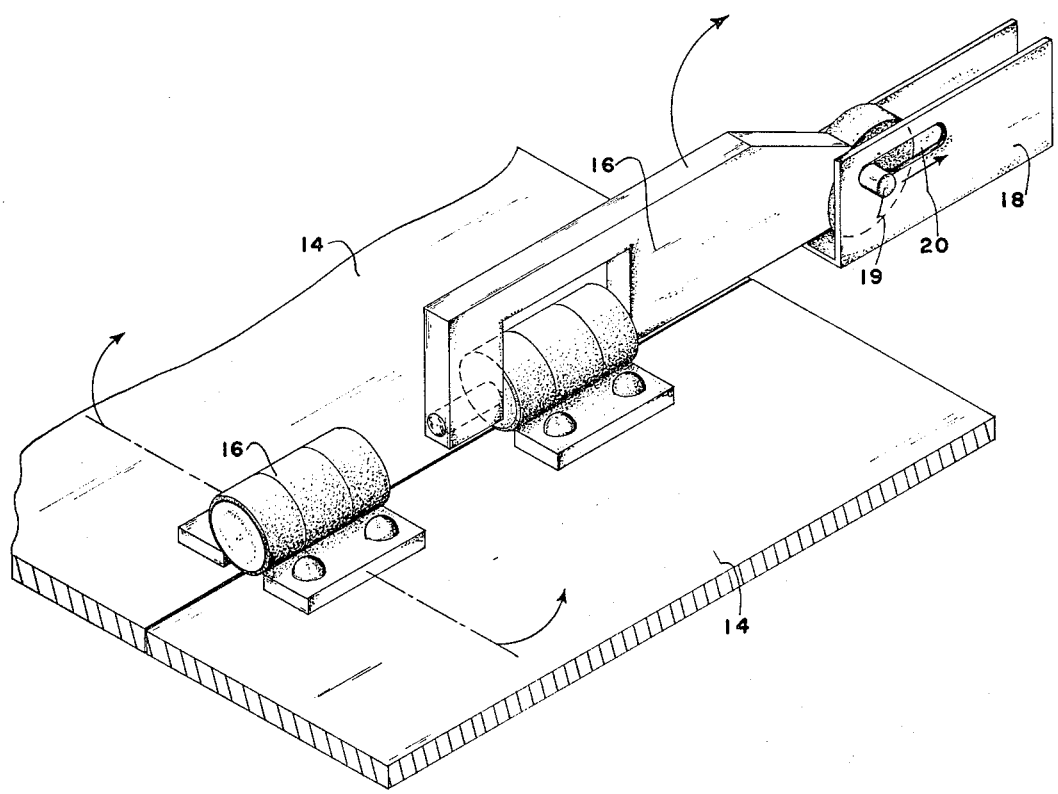

Aug. 13, 1968 R. R. CARMAN ET AL 3,397,399
COLLAPSIBLE DISH REFLECTOR
Filed Feb. 7, 1966 2 Sheets-Sheet 1
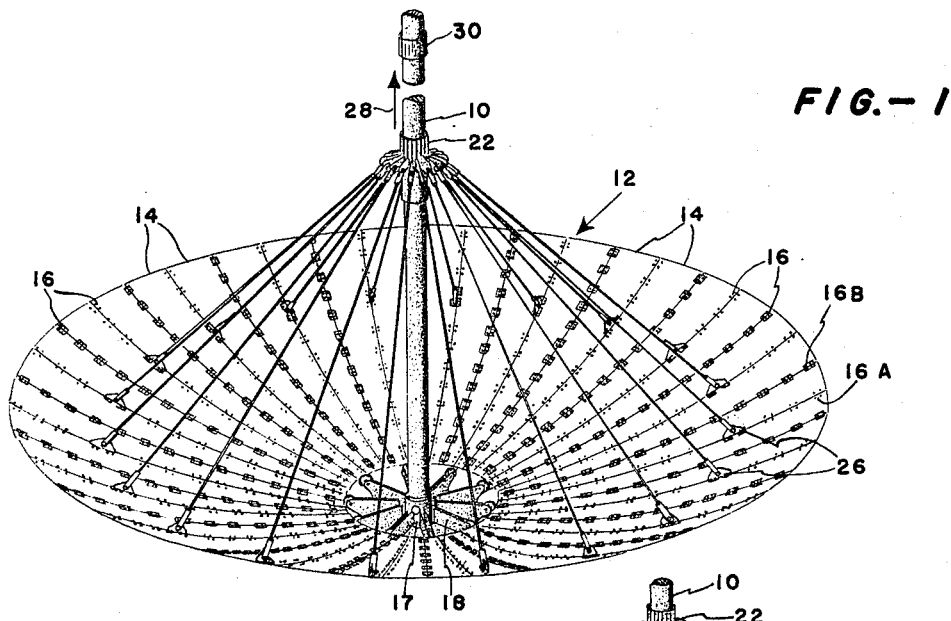
FIG.—1
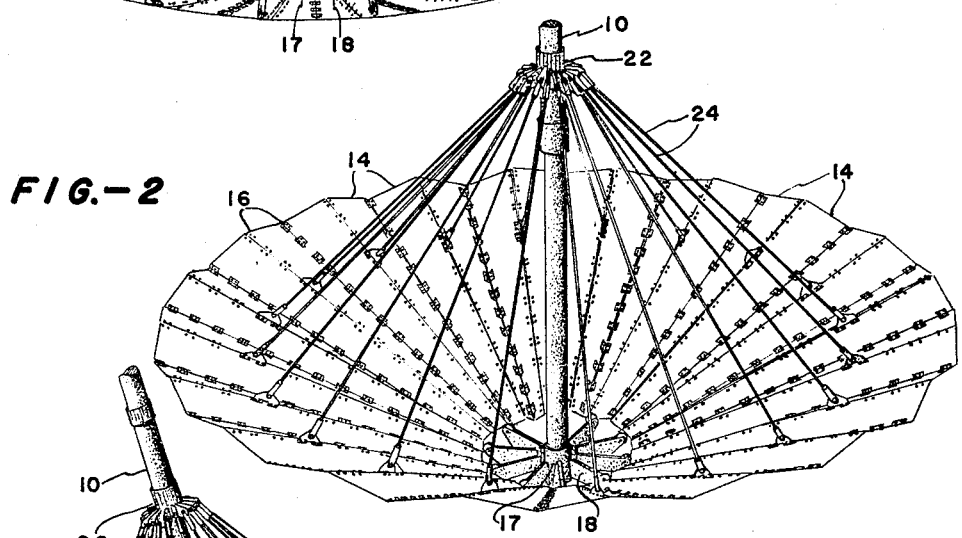
FIG.—2
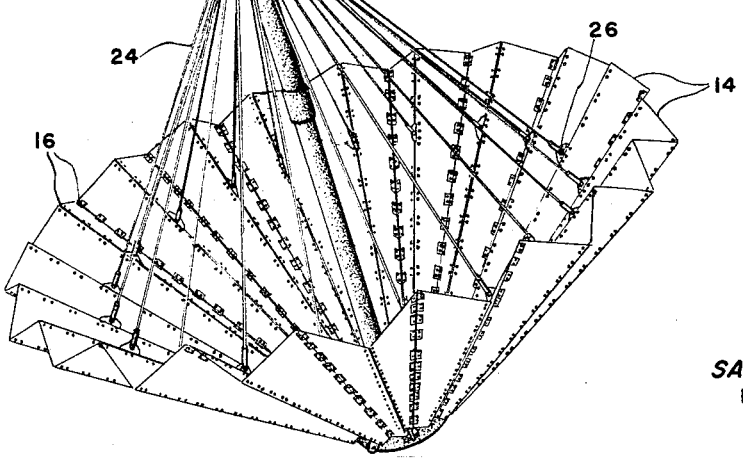
FIG.—3
INVENTORS
*ROBERT R. CARMAN*
*SALVATORE J. PIPITONE*
BY:
ATTORNEY United States Patent Office 3,397,399
Patented Aug. 13, 1968

3,397,399
COLLAPSIBLE DISH REFLECTOR
Robert R. Carman, Tallmadge, and Salvatore J. Pipitone, Akron, Ohio, assignors to Goodyear Aerospace Corporation, Akron, Ohio, a corporation of Delaware
Filed Feb. 7, 1966, Ser. No. 525,509
7 Claims. (Cl. 343—915)

This invention relates to a compound curvature antenna, or the like, which is made collapsible by extending radially outwardly directed hinge means from the center of the antenna which pivotally connect a series of compound curved petals, the hinge means permitting the petals to define a compound parabolic surface but allowing them to pivot on their hinged connections to effect a collapsing of the antenna without distorting any petals beyond their elastic limits.

Heretofore there have been various types of antennas, or the like, which have been adapted to use on a space vehicle, but generally none of these provide a relatively large reflector surface of conventional structural materials that can be packaged in a relatively small volume and automatically unfurled by a simple operation. The antennas or solar reflectors hereinbefore provided have been limited to small dimensions or complex systems or structures to unfurl same, thus reducing the overall effectiveness and efficiency of the antenna.

Current published concepts of large packagable rigid collectors consist of paraboloids cut into petal elements via a series of radial cuts. The petals are treated as singularly rigid elements individually hinged from a center hub for packaging into a cylindrical envelope. When deployed, the petals cantilever from the hub and, in some cases, one to three interconnecting latches, between petals, are engaged at deployment to provide a degree of hoop-tension continuity to the paraboloid. It is immediately apparent that with such constructions: (1) the support of a series of "free" or individual petals to withstand the launch environment requires interconnection of the petals through auxiliary structure, which means added weight and complexity, and (2) in the deployed attitude, it is not possible to affect the inherent structural efficiency of a one-piece paraboloid of revolution.

In view of these fundamental objections to existing concepts, and to meet the general object of the invention a rigid petal mirror has been developed wherein each petal is structurally attached to its adjacent petal. This attachment is maintained in the packaged condition, through the deployment cycle, and in full deployment.

The principle of the design is that a paraboloid is cut into petal elements via a series of radial cuts and the petals interconnected by mechanical hinges—either a continuous piano hinge or piano hinge segments—uniformly spaced along the petal edge, thus establishing, in effect, "curved hinge lines." In the deployed state, this composite structure (petals plus hinges) is the structural equivalent of a one-piece paraboloid of the same construction as the individual petals. Thus, it can be seen, that in comparison to any of the aforementioned "free" petal systems of a similar petal construction, the resultant structure is several orders of magnitude improved for an equal weight. This improvement is in terms of orbital performance occasioned by reduced deflections due to induced thermal stress and much higher natural frequency of the structural system which should prove highly significant when considering the problems of a servo-system for sun orientation, and static deflection when deployed in a 1 G field.

In fact, experimental proof shows that this design permits, under static conditions in a 1 G field, attainment of a very high dimensional accuracy for an orbital collector.

Packaging of the "curved-hinge" collector system is accomplished by recognizing that any large rigid petal, constructed within the weight limits considered necessary (approximately 0.2 p.s.f.) will have a flexural stiffness such that the petal can be flattened without inducing a high percentage of the allowable yield stress of the petal material. Thus, the paraboloid is essentially transformed into a cone and the curved hinge lines become straight line elements of the cone permitting an accordion-like folding of the collector structure. The important consideration is that the strain energies imposed on the petal structure, due to flattening of the petals, are a small percentage (less than 25%) of the allowable yield stress of the material composite, so that creep phenomena is not a problem, and, therefore, at deployment the petals return to the zero strain-condition to which they were initially fabricated and assembled. Hinged connections between a central hub and the petals allow the collector to package into a cylindrical envelope of a height approximately equal to the length of the petals.

The basic collector concept is not dependent on a specific method of deployment. Rather, several methods of deployment are available—and for a given system being considered—the deployment method most mutually compatible with all aspects thereof would be selected.

Another object of the invention is to provide means which pivotally connect the inner end of at least certain of the curved petals in order to allow a collapsing pivotal movement of the curved petals toward themselves so that the paraboloid formed by the petals can be collapsed in umbrella-like fashion.

Another object of the invention is to provide means which act to exert a stress force on the compound curved petal forming the paraboloid antenna, said stress exerting force causing the curved petals to be bent into a flat shape without exceeding the yield stress thereof, whereby said petals may pivot on their adjacent lateral edges, effectively collapsing the antenna.

Another object of the invention is to provide means for holding the antenna in collapsed form so to facilitate packaging in a space ship or the like until the antenna is to be deployed by permitting the petals forming the antenna to return to their original curved shape without any internal stress.

These, and other objects which will become apparent as the description proceeds, are achieved by providing in an antenna or the like, the combination of a compound curvature, dish-shaped, paraboloid antenna, the antenna comprising a plurality of separate similar compound curved petals having lateral edges defined by radii of the antenna, relatively flexible hinge means pivotally connecting the lateral adjacent edges of said petals to each other, a center hub, means pivotally connecting the inner end of at least certain petals to the hub to allow pivotal movement of said petals in a plane which includes the axis of the antenna, and means to induce stress on said petals and cause a flexing thereof, transforming the petals from a compound curvature to a substantially flat plane and the antenna to a substantially conical shape, thereby collapsing the antenna to a substantially cylindrical shape as the petals pivot on their adjacent lateral edges.

For a better understanding of the apparatus of the invention, reference should be had to the following drawings wherein:

FIGURE 1 is a perspective view of one embodiment of the invention showing it in its fully extended, working form;

FIGURE 2 also is a perspective view of the embodiment of FIGURE 1, showing it in a partially collapsed form;

FIGURE 3 is also a perspective view of the embodiment of FIGURE 1, showing it in a more fully collapsed form; and FIGURE 4 is an enlarged perspective view, partially broken away, of a portion of the hinge means incorporated in the embodiment of FIGURES 1 to 3.

For a better understanding of the apparatus of the invention, reference should first be had to FIGURE 1 wherein the numeral 10 indicates a substantially cylindrically shaped pole upon which the antenna of the invention is mounted. A compound curvature, dish-shaped, paraboloid antenna, indicated generally by the numeral 12 is secured at the center thereof to one end of the pole 10.

The paraboloid antenna 12 is composed of a plurality of substantially wedge shaped, compound curved petals 14. The petals 14 will be made of a somewhat flexible material weighing between about .1 to about .5 pounds per square foot. The material will preferably have great elasticity before taking permanent set or deformation. Defining and connecting the adjacent lateral edges of the curved petals 14 are a plurality of hinge means 16, which extend radially outwardly from the center of the antenna 12. The hinge means 16 thus act to pivotally connect the adjacent lateral edges of the petals 14 to each other. It should also be noted, that the hinge means 16 are alternately fixed to the inside of the antenna and the outside of the antenna; for example, hinge means 16A is affixed to the outside of the antenna and will allow the adjacent lateral edges of the petals 14 to only pivot inwardly, while hinge means 16B is affixed to the inside of the antenna and will only allow the adjacent lateral edges of the petals 14 to pivot in an outwardly direction. This allows an accordion type folding of the petals into the collapsed state as will be more fully explained hereinafter. The hinge means 16 may be separate small hinges or lengthy piano type hinges, but have some play allowing a flexibility or relative movement of the petals thereto during collapsing or deploying of the antenna.

Secured to one end of the pole 10 is a hub, indicated generally by numeral 17, to which are connected a plurality of channel-shaped, flange members 18 which function to pivotally connect by pins 19 the inner end of at least certain petals 14 in order to allow pivotal movement of the petals 14 connected thereto, upwardly in a plane which includes the pole 10. As best illustrated by FIGURE 4, the channel-shaped flange members 18 may preferably also allow slidable movement of the pin 19 in a direction radially from the end of the pole 10. This is achieved by incorporating a radially directed slot 20 cut in the flange means 18. Normally the pin 19 will ride in the outboard end of slot 20 when the antenna is in the deployed condition while it will slide to the inboard end of slot 20 when the antenna is collapsed.

Slidably received by the pole 10 is a substantially O-shaped ring 22 which is adapted to slide in complementary relationship on said pole 10. Pivotally secured around the outer circumference of the ring 22 are a plurality of support rods 24 which have the other ends thereof pivotally secured to at least certain hinge means 16 at flanges 26, said point being equidistant from the center of the antenna 12. Again the pivotal relation of the rods 24 to both the ring 22 and the flanges 26 allows pivotal movement only in a plane containing the pole 10.

When a force is exerted on the O-shaped ring 22, in a direction of the arrows 28 in FIGURE 1, said force will act through the support rods 26 to pull the hinge means 16 in an inwardly direction. Such a force will induce a stress on the petals 14, causing them to flex in an inwardly direction and transform the petals from a compound curvature form to a substantially flat plane. As the curved petals 14 are pulled out of their natural compound curved shape to a one plane shape, the petals 14 will pivot on their adjacent lateral edges and effect a collapsing of the antenna 12, this process being best illustrated by FIGURES 2 and 3. Of course, a suitable holding clamp 30 may be mounted to the pole 10 to hold the ring 22 in position after the antenna has been fully collapsed, thereby retaining the antenna in the collapsed condition.

As the collapsing of the antenna 12 occurs, and the petals 14 are pivoted upwardly the means pivotally connecting the inner edges of the petals 14 will begin to slide radially inwardly in the slot 20 in the channel 18. This inward sliding movement enables the antenna to form a cylindrically shaped package of smaller diameter when the antenna 12 is totally collapsed, as well as tending to eliminate some of the stress on the petals caused by the collapsing action.

It should be noted that the stress exerted on the petals 14 causing them to flex from their natural curved shape to a flat shape, is not so great a force as to pass the bounds of elasticity or permanent deformation of the petals 14. In fact the invention contemplates that stress forces of only about 25% of those necessary to cause permanent deflection should be utilized. As such, when the force exerted on the O-shaped ring 22 is released, the natural spring tension of the petals 14 will cause the O-shaped ring 22 to slide back to its original position on the pole 10 with the petals 14 flexing back to their original curved shape whereby the original paraboloid shape of the antenna 12 is restored.

It should further be understood that the antenna might be utilized as a solar collector with an appropriate surface coating and a collector mounted at the focal point of the reflected rays. Also, of course the antenna may function in the usual manner for transmission or reception of electromagnetic waves. In any case the material comprising the antenna may be greatly varied to meet the desired objects for the use thereof.

The important improvement of the invention is to be able to collapse a paraboloid antenna of compound curvature into a small package which may be inserted into a space environment to snap into its predetermined form again. Thus, any structural apparatus to achieve the collapse will meet the objects of the invention. The use of the rods 24 and ring 22 merely represent one structural application. Of course, the sliding pivotal mounting of at least certain of the petals to allow collapsing to a smaller package is another important aspect of the invention.

While in accordance with the patent statutes only one best known embodiment of the invention has been illustrated and described in detail, it is to be particularly understood that the invention is not limited thereto or thereby, but that the inventive scope is defined in the appended claims.

What is claimed is:
1. In an antenna the combination of
  a substantially cylindrically shaped pole,
  a substantially O-shaped metal ring received in complementary sliding relationship by said pole.
  a compound curvature, dish shaped, paraboloid antenna secured at the center thereof to one end of said pole, said antenna comprising,
  a plurality of separate similar electrically conducting compound curved petals made from a flexible material and having lateral edges defined by radii of the antenna,
  hinge means, pivotally connecting the lateral curved edges of said petals in relatively flexible relation to each other,
  means pivotally connecting the inner end of at least certain petals to the one end of said pole to allow pivotal movement of said petals in a plane which includes the pole, and
  a plurality of support rods, one end of each rod being pivotally secured to said O-shaped metal ring and the other end of each rod being pivotally secured to at least certain hinge means at points equidistant from the center of said antenna whereby slidable movement of said O-shaped metal ring away from said one end of said pole induces stress on said petals and causes a flexing thereof, transforming said petals from a compound curvature to substantially flat plane, thereby collapsing the antenna to a substantially cylindrical shape as the petals pivot on their adjacent lateral edges.

2. In an antenna the combination of
a cylindrically shaped pole,
a substantially O-shaped ring, received in complementary sliding relationship by said pole,
a compound curvature reflector secured at the center thereof to one end of said pole, the reflector comprising,
a plurality of substantially wedge shaped compound curved petals made from a flexible material,
a plurality of relatively flexible piano hinges pivotally connecting the lateral edges of said petals to each other,
means pivotally connecting the inner end of at least certain of said hinge pins to the one end of said pole to allow pivotal movement of said hinge pins in a plane which includes the pole, and
a plurality of support rods, one end of each rod being pivotally secured to said O-shaped ring and the other end of each rod being pivotally secured to at least certain hinge pins at points equidistant from the center of said antenna.

3. In a collapsible parabolic shaped reflector the combination of
a plurality of flexible wedge shaped petals in edge to edge relation defining a compound curvature parabolic shape having an imaginary axis, where each petal is preformed to a required compound curvature,
hinge means connecting the lateral adjacent edges of the petals in alternately pivotal relationship whereby one lateral edge of each petal will pivot toward the imaginary axis of the parabolic shape and the other edge away from the axis of the parabolic shape,
a small substantially circular central frame,
means connecting at least some of the inner ends of the petals to the central frame, said connection is pivotal in a plane containing the imaginary axis of the parabolic shape, and
means to force at least certain of the petals toward the imaginary axis thereby bending all the petals into a substantially flat shape whereupon they pivot at their lateral edges relative to each other and collapse into a substantially cylindrical shape.

4. A reflector according to claim 3 where the pivotal relation of the certain petals to the central frame is also made radially slidable inwardly whereby the collapse of the petals forms a cylindrical shape of lesser diameter.

5. In a compound, curvature reflector, the combination of
a plurality of separate petals made from a flexible material having compound curves, and defining a compound curvature shape with a focal point and axis of symmetry in unstressed edge by edge adjacent relationship,
hinge means, pivotally connecting the adjacent lateral edges of said petals to each other, and means to force a flexing of said petals from a compound curved shape to a flat, one plane shape, but not beyond their elastic limit whereby said petals pivot on the hinge means connecting their adjacent lateral edges, collapsing toward each other, and
means to force an unflexing of said petals from the flat, one plane shape to the normal unstressed compound curved shape thereby causing the petals to pivot on the hinge means connecting their adjacent lateral edges and unfurl to define the compound curvature reflector.

6. An antenna comprising
a plurality of separate, compound curved petals,
a plurality of hinge means, extending radially outwardly from a common point and pivotally connecting the lateral edges of adjacent curved petals, the combination forming a dish-shaped, compound curved reflector with each of said curved petals forming sections therein, and
means to hold said petals collapsed inwardly thereby flexing said petals from an unstressed compound curved shape to a stressed, substantially flat plane whereby said petals pivot on their adjacent lateral edges, collapsing from the compound curved shape to a symmetrically shaped package, and
means to force said petals from the stressed, substantially flat condition toward the compound curved condition thereby causing an unfurling from the package to the compound curved reflector as the petals pivot relative to each other on their adjacent lateral edges to an unstressed condition.

7. In an antenna or the like, the combination of
a compound curvature, dish-shaped reflector having an axis of symmetry, said reflector comprising,
a plurality of separate energy reflecting compound curved petals having lateral edges,
hinge means pivotally connecting the lateral edges of said petals to each other,
a centrally positioned supporting frame,
means pivotally connecting the inner end of at least certain petals to the supporting frame to allow pivotal movement of said petals in a plane which includes the axis of symmetry of the reflector, and
means to force at least certain of the petals away from the axis of symmetry to cause a flexing thereof, thereby transforming all said petals from a forced, substantially flat plane to a compound curvature, thereby unfurling the reflector from a collapsed, folded condition to the preformed, compound curvature shape as the petals pivot with respect to each other on their adjacent lateral edges.

References Cited

UNITED STATES PATENTS 2,945,234    7/1960    Driscoll _____ 343—915
3,286,270    11/1966    Kelly _____ 343—915

ELI LIEBERMAN, *Primary Examiner.*